United States Patent [19]

Hord

[11] Patent Number: 4,856,213
[45] Date of Patent: Aug. 15, 1989

[54] COMBINATION PICTURE FRAME AND VIDEO CASSETTE HOLDER

[75] Inventor: H. S. Hord, Omaha, Nebr.

[73] Assignee: Micott Corp., Omaha, Nebr.

[21] Appl. No.: 161,794

[22] Filed: Feb. 29, 1988

[51] Int. Cl.⁴ .............................................. G09F 1/12
[52] U.S. Cl. ..................................... 40/152; 40/152.1; 40/455
[58] Field of Search ....................... 40/152, 152.1, 455

[56] References Cited

U.S. PATENT DOCUMENTS

| | | | |
|---|---|---|---|
| 2,191,373 | 2/1940 | Dankanyn | 40/152.1 |
| 2,293,301 | 8/1942 | Mitchell | 40/152.1 |
| 2,314,417 | 3/1943 | Neal | 40/152.1 |
| 3,857,191 | 12/1974 | Sadorus | 40/455 |
| 4,541,188 | 9/1985 | Sadorus | 40/455 |

*Primary Examiner*—Gene Mancene
*Assistant Examiner*—Wenceslao J. Contreras
*Attorney, Agent, or Firm*—Zarley, McKee, Thomte, Voorhees & Sease

[57] ABSTRACT

A combination picture frame and video cassette holder comprising a picture frame having a video cassette holder mounted on the rearward side thereof.

6 Claims, 2 Drawing Sheets

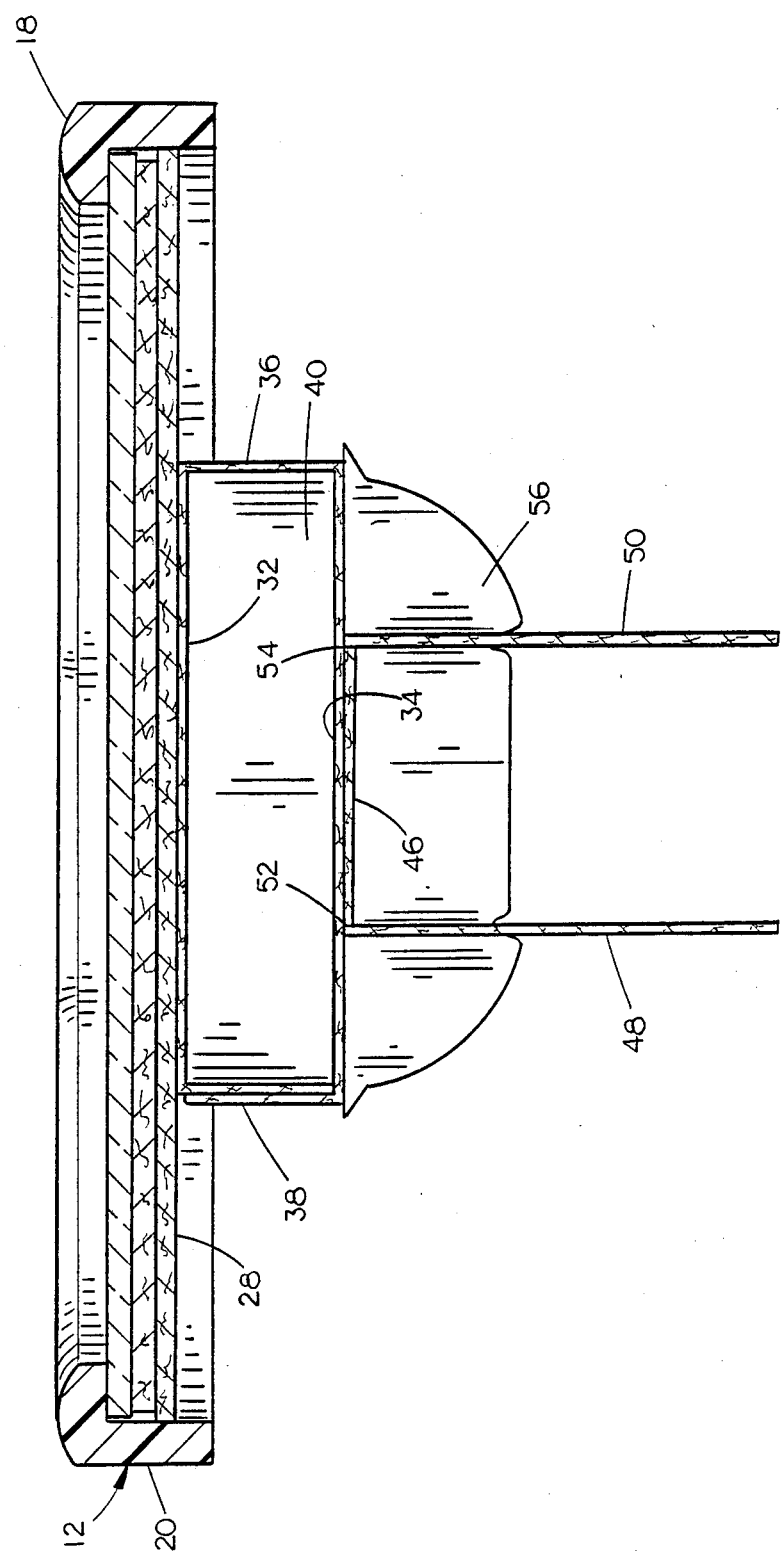

COMBINATION PICTURE FRAME AND VIDEO CASSETTE HOLDER

BACKGROUND OF THE INVENTION

This invention relates to a video cassette holder and more particularly to a video cassette holder which is mounted on the back of a picture frame.

There are many instances wherein both still photographs and video cassettes are utilized to remember or commemorate special occasions such as trips, conventions, group meetings, etc. A problem associated with having both a still photograph and a video cassette of such an occasion is that the photograph and video cassette become separated.

It is therefore a principal object of the invention to provide a combination picture frame and video cassette holder.

A further object of the invention is to provide a video cassette holder mounted on the back of a picture frame which does not interfere with the aesthetic qualities of the picture frame.

A further object of the invention is to provide a combination picture frame and video cassette holder which conveniently stores the video cassette.

These and other objects will be apparent to those skilled in the art.

SUMMARY OF THE INVENTION

The combination picture frame and video cassette holder of this invention comprises a backing member which is conveniently secured to the back of a conventional picture frame and which has a rectangular video cassette receptacle provided thereon as well as a foldable stand.

BRIEF DESCRIPTION OF THE DRAWINGS

FIG. 4 is a sectional view of the invention as seen on lines 4—4 of FIG. 3.

DESCRIPTION OF THE PREFERRED EMBODIMENT

Figure 2:
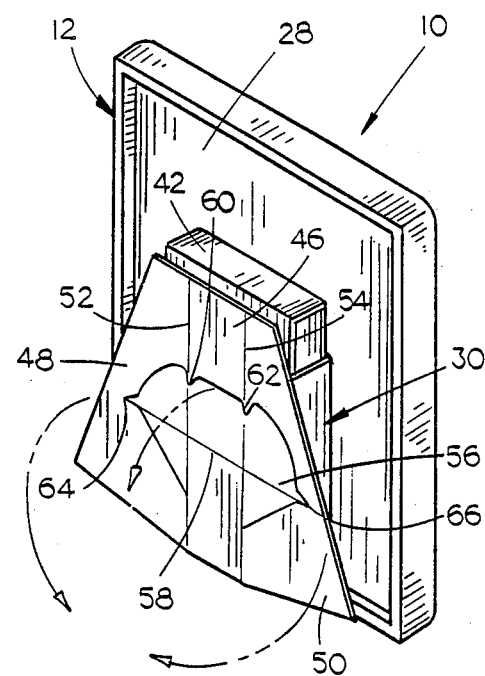
FIG. 2 is a rear perspective view of the invention with the broken lines indicating the position to which the legs of the foldable stand may be moved.

The combination picture frame and video cassette holder apparatus of this invention is referred to generally by the reference numeral 10. Apparatus 10 includes a conventional picture frame 12 having a upper end 14, lower end 16 and opposite side members 18 and 20. The front portion of the picture frame 12 is provided with glass 22 which is positioned forwardly of a mat 24 or the like having a central opening 26 provided therein to permit the photograph to be viewed therethrough. The photograph will normally be positioned behind the mat 24 and will be maintained in position by a conventional backing member. In this case, the conventional backing member is not utilized but is substituted with a backing member 28 which is received within the rear portion of the frame as illustrated in FIG. 2. A rectangular video cassette holder 30 is glued or otherwise secured to the rearward side of backing member 28 and includes front wall 32, back wall 34, side walls 36 and 38 and bottom 40.

As seen in the drawings, the upper end of holder 30 is open which is adapted to receive a video cassette 40 and its box 42.

Figure 3:
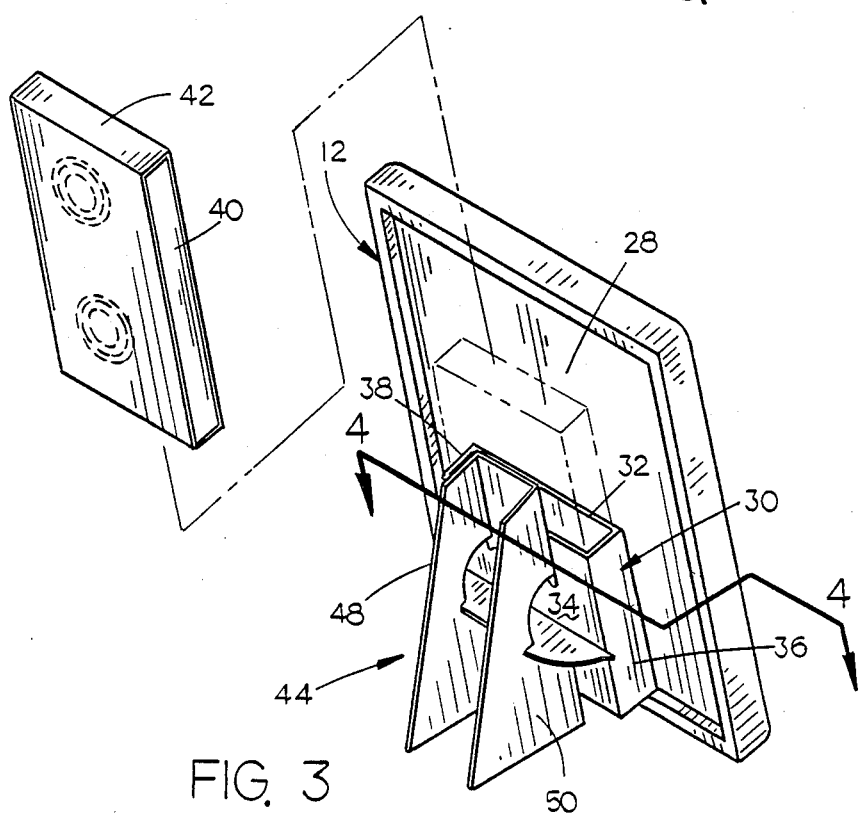
FIG. 3 is an exploded perspective view illustrating the manner in which the video cassette may be removed from the cassette holder.

The numeral 44 refers to a foldable stand which may be moved from the folded position of FIG. 2 to the unfolded position of FIG. 3 so that the apparatus 10 may be supported in the upstanding position as illustrated in FIG. 3. Stand 44 includes a base portion 46 which is glued or otherwise secured to rear wall 34 and has legs 48 and 50 foldably or pivotally provided thereon adapted to fold along the fold lines 52 and 54 respectively. A foldable retainer 56 is provided and is foldable along fold line 58 so as to be moved from the position of FIG. 2 to the position of FIG. 4. Retainer 56 includes a pair of spaced-apart notches 60 and 62 provided thereon which are adapted to engage the V-shaped notches 64 and 66 in legs 48 and 50 respectively to maintain the legs in the position illustrated in FIG. 3.

Figure 1:
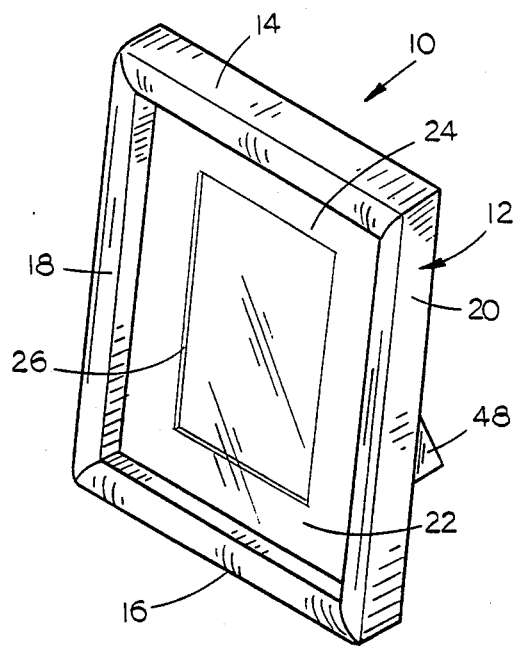
FIG. 1 is a front perspective view of the invention.

Thus, a suitable picture commemorating a special occasion is inserted into the picture frame 12 and the appropriate video cassette, with its associated box or container, is inserted into the holder 30 so that the video cassette will be maintained in close association with the associated photograph. The video cassette may be conveniently inserted into the holder 30 or removed therefrom. As seen in FIG. 1, the design of the holder 30 is such that it does not interfere with the aesthetic appearance of the apparatus.

Thus it can be seen that a novel combination picture frame and video cassette holder has been provided which achieves all of its stated objectives.

I claim:

1. In combination,
   a picture frame means having rearward and forward sides, an upper end, a lower end, and opposite side edges,
   and a video cassette holder on the rearward side of said picture frame.

2. The combination of claim 1 wherein a stand means is also mounted on the rearward side of said picture frame means for supporting said picture frame means in an upstanding position.

3. The combination of claim 2 wherein said stand means and said video cassette holder are integrally formed.

4. The combination of claim 1, wherein said video cassette holder comprises an elongated, U-shaped member positioned vertically at the rearward side of said picture frame means, for slidably receiving a video cassette therein.

5. The combination of claim 4, wherein said U-shaped member comprises a generally rectangular back wall which is parallel to the rearward side of said picture frame means and spaced rearwardly therefrom, said back wall including an upper end, a lower end, and opposite side edges, spaced-apart side walls extending from the side edges of said back wall to said rearward side of said picture frame means, and a bottom wall extending from the lower end of said back wall, between said side edges, to said rearward side of said picture frame means, forming a pocket for slidably receiving a portion of a video cassette.

6. The combination of claim 1 wherein said stand means may be moved between operative and inoperative positions.

* * * * *